(12) United States Patent
Am et al.

(10) Patent No.: US 10,430,366 B2
(45) Date of Patent: Oct. 1, 2019

(54) SYSTEMS AND METHODS FOR CONFIGURATION OF HOT-INSERTED DEVICE PRIOR TO OPERATING SYSTEM CONTROL OF DEVICE

(71) Applicant: Dell Products L.P., Round Rock, TX (US)

(72) Inventors: Manjunath Am, Bengaluru (IN); Austin P. Bolen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 223 days.

(21) Appl. No.: 15/384,951

(22) Filed: Dec. 20, 2016

(65) Prior Publication Data

US 2018/0173664 A1 Jun. 21, 2018

(51) Int. Cl.
*G06F 13/40* (2006.01)
*G06F 13/24* (2006.01)

(52) U.S. Cl.
CPC .......... *G06F 13/4081* (2013.01); *G06F 13/24* (2013.01)

(58) Field of Classification Search
None
See application file for complete search history.

(56) References Cited

U.S. PATENT DOCUMENTS

| 7,447,934 | B2 | 11/2008 | Dasari et al. |
| 7,814,254 | B2 | 10/2010 | Abumi |
| 2005/0172038 | A1* | 8/2005 | Biggs .................. G06F 11/2289 710/1 |
| 2014/0156898 | A1 | 6/2014 | Luo et al. |
| 2017/0075839 | A1* | 3/2017 | Lu ............................ G06F 13/38 |
| 2017/0111455 | A1* | 4/2017 | Raju ..................... H04L 67/141 |

* cited by examiner

*Primary Examiner* — Scott C Sun
(74) *Attorney, Agent, or Firm* — Jackson Walker L.L.P.

(57) ABSTRACT

In accordance with embodiments of the present disclosure, an information handling system may include a processor and a port configured to couple a hot-pluggable device received in the information handling system to the processor. The port may comprise a hot-plug controller configured to detect the insertion of the hot-pluggable device into the information handling system and delay communication of a hot-plug interrupt to an operating system executing on the processor in response to the insertion of the hot-pluggable device in order to allow for platform-specific configuration of the hot-pluggable device.

22 Claims, 2 Drawing Sheets

SYSTEMS AND METHODS FOR CONFIGURATION OF HOT-INSERTED DEVICE PRIOR TO OPERATING SYSTEM CONTROL OF DEVICE

TECHNICAL FIELD

The present disclosure relates in general to information handling systems, and more particularly to methods and systems for configuring a hot-inserted device prior to an operating system asserting control over such device.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modern information handling systems often include the ability to "hot plug" devices, such as hard disk drives. In general, "hot plugging" refers to insertion or replacement of a device of an information handling system without shutting down the information handling system and without significant interruption to the operation of the information handling system. However, in certain information handling system architectures, including those with the ability to receive hot-plugged Peripheral Component Interconnect Express (PCIe) devices, an operating system of the information handling system may take control of the device before a basic input/output system (BIOS) or other hardware and/or firmware has an opportunity to make platform-specific configurations of the device. Examples of such configurations include changing class codes of a device and/or unlocking of the device (e.g., with a digital key).

SUMMARY

In accordance with the teachings of the present disclosure, the disadvantages and problems associated with existing approaches for managing hot-pluggable devices in an information handling system may be reduced or eliminated.

In accordance with embodiments of the present disclosure, an information handling system may include a processor and a port configured to couple a hot-pluggable device received in the information handling system to the processor. The port may comprise a hot-plug controller configured to detect the insertion of the hot-pluggable device into the information handling system and delay communication of a hot-plug interrupt to an operating system executing on the processor in response to the insertion of the hot-pluggable device in order to allow for platform-specific configuration of the hot-pluggable device.

In accordance with these and other embodiments of the present disclosure, a method may include detecting insertion of a hot-pluggable device into an information handling system comprising a processor and a port configured to couple the hot-pluggable device to the processor and delaying communication of a hot-plug interrupt to an operating system executing on the processor in response to the insertion of the hot-pluggable device in order to allow for platform-specific configuration of the hot-pluggable device.

In accordance with these and other embodiments of the present disclosure, a hot-pluggable device may include circuitry configured to, in response to insertion of the hot-pluggable device into an information handling system, delay communication of a hot-plug interrupt to an operating system executing on the processor in response to the insertion of the hot-pluggable device in order to allow for platform-specific configuration of the hot-pluggable device.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
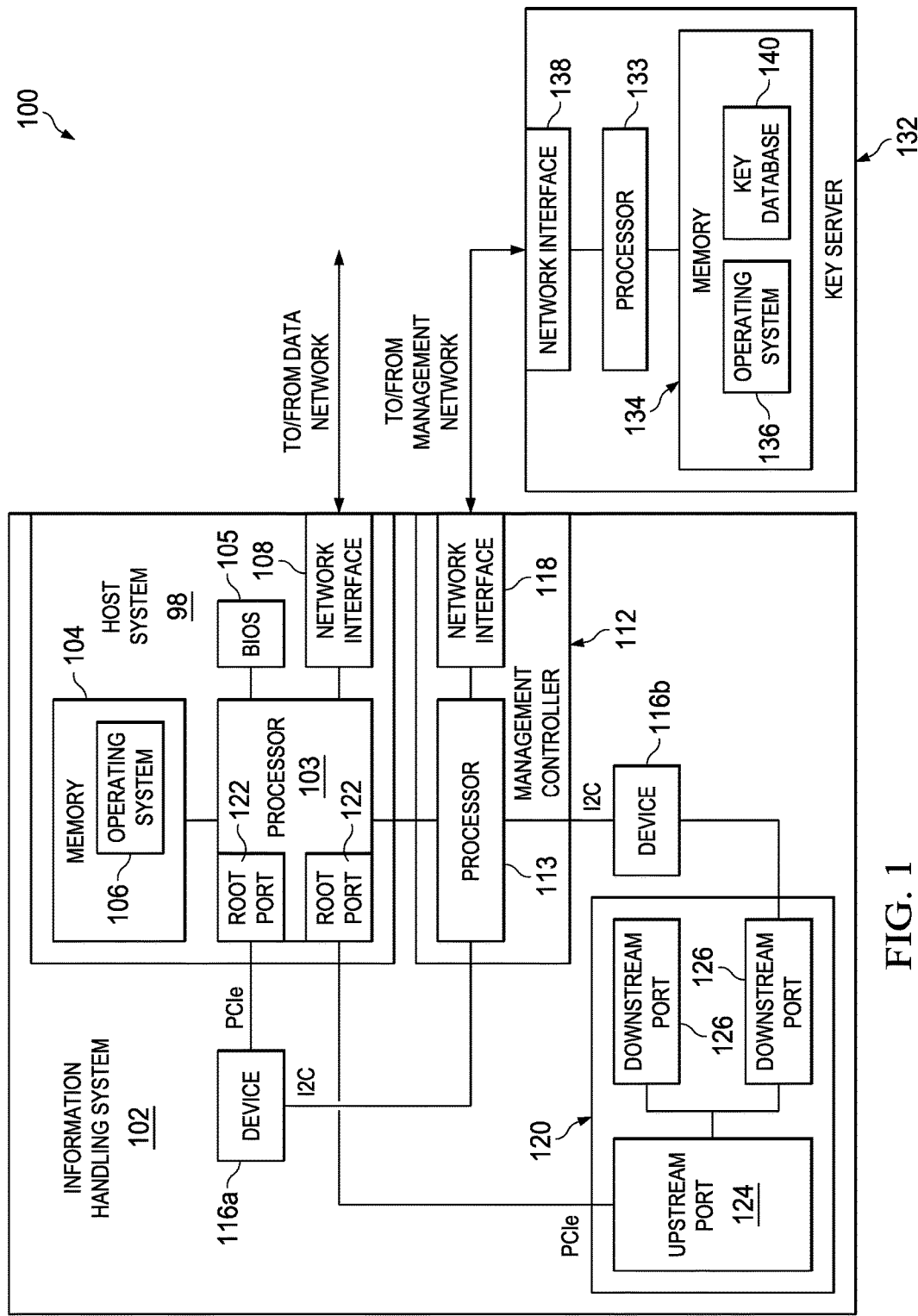
FIG. 1 illustrates a block diagram of an example system for configuration of a hot-inserted device prior to operating system control of the device, in accordance with embodiments of the present disclosure.
Figure 2:
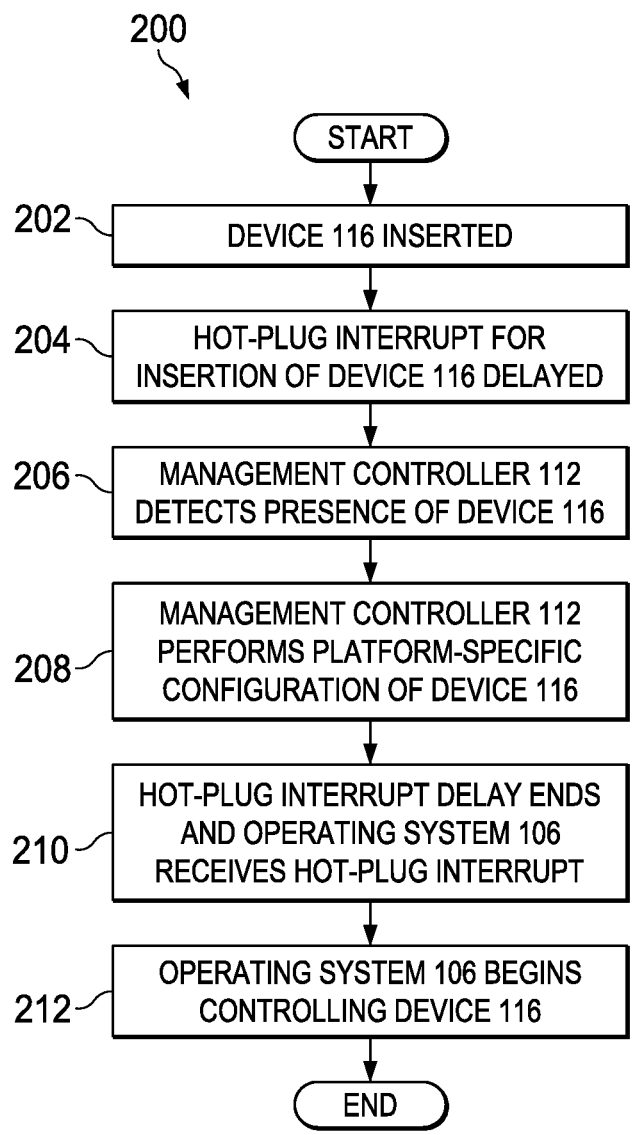
FIG. 2 illustrates a flowchart of an example method for configuration of a hot-inserted device prior to operating system control of the device, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example system 100 for configuration of a hot-inserted device prior to operating system control of the device, in accordance with embodiments of the present disclosure. As shown in FIG. 1, system 100 may include an information handling system 102 and a key server 132 communicatively coupled to information handling system 102.

In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a network interface 108 communicatively coupled to processor 103, a device 116a communicatively coupled to processor 103, and a device 116b communicatively coupled to processor 103 via a switch 120.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

As shown in FIG. 1, processor 103 may include one or more root ports 122. A root port 122 may include any suitable system, device, or apparatus configured to serve as an interface between processor 103 and a communications bus (e.g., a PCIe bus) to which one or more devices 116 may be coupled, as described in greater detail below.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Network interface 108 may comprise any suitable system, apparatus, or device operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

In operation, processor 103, memory 104, BIOS 105, and network interface 108 may comprise at least a portion of a host system 98 of information handling system 102.

Management controller 112 may be configured to provide management facilities for management of information handling system 102. Such management may be made by management controller 112 even if information handling system 102 is powered off or powered to a standby state. Management controller 112 may include a processor 113, memory, and a management network interface 118 separate from and physically isolated from data network interface 108. In certain embodiments, management controller 112 may include or may be an integral part of a baseboard management controller (BMC) or a remote access controller (e.g., a Dell Remote Access Controller or Integrated Dell Remote Access Controller). As shown in FIG. 1, management controller 112 may comprise a processor 113 and a network interface 118 communicatively coupled to processor 113.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in a memory and/or another component of information handling system 102 or management controller 112. As shown in FIG. 1, processor 113 may be communicatively coupled to processor 103. Such coupling may be via a Universal Serial Bus (USB), System Management Bus (SMBus), and/or one or more other communications channels.

Each of device 116a and device 116b (which may be referred to herein individually as "device 116" and collectively as "devices 116") may be communicatively coupled to processor 103 and may generally include any information handling resource. For example, device 116a may be coupled to processor 103 via a communications bus (e.g., a PCIe bus) and root port 122 of processor 103. As another example, device 116b may be coupled to processor 103 via a switch 120. In some embodiments, one or more of devices 116 may comprise a PCIe device. In particular embodiments, one or more of devices 116 may comprise a solid-state drive (e.g., a non-volatile memory device). In these and other embodiments, as shown in FIG. 1, each device 116 may have an out-of-band interface to processor 113 of management controller, via an Inter-Integrated Circuit (I2C) bus or other bus.

Switch 120 may comprise any system, device, or apparatus configured to provide an interface between information handling system 102 and one or more devices 116. In some embodiments, switch 120 may comprise a PCIe switch. As shown in FIG. 1, switch 120 may comprise an upstream port 124 communicatively coupled to processor 103 via a communications bus (e.g., PCIe bus) and a root port 122 of processor 103. Such upstream port 124 may fan out to a plurality of downstream ports 126, each downstream port 126 configured to be coupled to a device (e.g., device 116b).

Network interface 118 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC."

In addition to processor 103, memory 104, network interface 108, management controller 112, devices 116a and 116b, and switch 120, information handling system 102 may include one or more other information handling resources.

Key server 132 may comprise an information handling system. As depicted in FIG. 1, key server 132 may include a processor 133, a memory 134 communicatively coupled to processor 133, and a network interface 138 communicatively coupled to processor 133.

Processor 133 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 133 may interpret and/or execute program instructions and/or process data stored in memory 134 and/or another component of key server 132.

Memory 134 may be communicatively coupled to processor 133 and may include any system, device, or apparatus configured to retain program instructions and/or data for a period of time (e.g., computer-readable media). Memory 134 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 134 may have stored thereon an operating system 136 and a key database 140. Operating system 136 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 136. In addition, operating system 136 may include all or a portion of a network stack for network communication via a network interface (e.g., network interface 138 for communication over a data network). Active portions of operating system 136 may be transferred to memory 134 for execution by processor 133. Although operating system 136 is shown in FIG. 1 as stored in memory 134, in some embodiments operating system 136 may be stored in storage media accessible to processor 133, and active portions of operating system 136 may be transferred from such storage media to memory 134 for execution by processor 133.

Key database 140 may include a list, map, table, or other data structure setting forth one or more keys for unlocking specific devices 116 for use by information handling system 102.

Network interface 138 may comprise any suitable system, apparatus, or device operable to serve as an interface between key server 132 and management controller 112 of information handling system 102 via an out-of-band management network coupling network interface 118 of management controller 112 to network interface 138 of key server 132. Network interface 138 may enable information handling system 102 to communicate using any suitable transmission protocol and/or standard. In these and other embodiments, network interface 138 may comprise a network interface card, or "NIC." In these and other embodiments, network interface 138 may be enabled as a local area network (LAN)-on-motherboard (LOM) card.

In addition to processor 133, memory 134, and network interface 138, key server 132 may include one or more other information handling resources.

In operation, one or more components of information handling system 102 may delay communication of a hot-plug interrupt to operating system 106 following hot-plug insertion of a device 116 in order to allow management controller 112 to configure such device 116 after its hot-plug insertion into information handling system 102 but before operating system 106 takes over control of such \device 116. Such delay of communication of the hot-plug interrupt may be undertaken in any suitable manner. For example, in some embodiments, a port coupled to a hot-plugged device (e.g., root port 122 coupled to device 116*a* and/or downstream port 126 coupled to device 116*b*) may include a hot-plug controller or other logic that delays communication of a hot-plug interrupt to operating system 106 (and thus delays the receipt by operating system 106 of the hot-plug interrupt). As another example, in other embodiments, a device 116 after insertion may, for a period of time after hot-plug insertion into information handling system 102, delay assertion of one or more signals (e.g., presence detect state signal) and/or delay activation of one or more components (e.g., delay activation of the data link layer) that may generate an interrupt indicating insertion of such device 116. Such delayed assertion of such one or more signals may in turn delay a hot-plug controller of a port (e.g., root port 122, downstream port 126) to which the device 116 is coupled from detecting the hot-plug insertion, which may have the effect of delaying the hot-plug controller-generated hot-plug interrupt from being communicated to operating system 106.

In some embodiments, operating system 106 may scan for devices 116 even without receiving notification of device presence. In such embodiments, delaying a device interrupt may avoid active notification to operating system 106. However, in such embodiments, operating system 106 could still scan for devices without notification and discover one or more devices 116, which could cause operating system 106 to take control of a device 116 before a BIOS 105 or other hardware and/or firmware has an opportunity to make platform-specific configurations of the device 16. To prevent such scenario, a root port 122 or switch 120 may be configured to simulate responses to operating system 106 bus scans to indicate to the operating system 106 that no device 116 is present, despite the presence of a device 116. For example, in PCIe, a root port 122 or switch 120 may be configured to respond with an Unsupported Request completion for any Configuration Reads issued by operating system 106 for the entire time such root port 122 or switch 120 is delaying the hot-plug interrupt.

During such hot-plug interrupt communication delay, management controller 112 may apply one or more platform-level configurations to the hot-plugged device 116. For example, in embodiments in which the device 116 is a solid-state drive, management controller 112 may change a class code for the device 116 in a storage controller (not explicitly shown in FIG. 1) of such device 116. As another example, in these and other embodiments in which the device 116 is a solid-state drive, management controller 112 may communicate with key server 132 in order to download a key from key database 140 corresponding to the inserted device 116 and apply the key to the device 116 (e.g., to "unlock" the device 116 to allow decryption of encrypted data stored to the device 116) via an out-of-band (e.g., I2C) interface between management controller 112 and the device 116.

In some embodiments, the delay of the hot-plug interrupt in response to insertion of a device 116 may be a pre-defined period of time (e.g., a particular number of seconds). In other embodiments, the delay may be dependent upon actual completion of configuration of a newly-inserted device 116 by management controller 112, in which case the device 116 or a hot-plug controller of a port to which the device is coupled may include logic configured to cause communication of the hot-plug interrupt to operating system 106 in response to completion of configuration of the newly-inserted device 116 by management controller 112.

Although the foregoing discussion has contemplated configuration of a device 116 via an out-of-band (e.g., I2C) interface, it is noted that in some embodiments, management controller 112 may communicate a PCIe Vendor-Defined Message (VDM) to a device 116 via processor 103. In such embodiments, certain lanes of communication between the device 116 and processor will need to be enabled while still preventing communication of a hot-plug interrupt to operating system 106.

FIG. 2 illustrates a flowchart of an example method 200 for configuration of a hot-inserted device prior to operating system control of the device, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, a device 116 may be inserted. In response, at step 204, the hot-plug interrupt may be delayed. Such delay may be implemented by logic of the hot-plug controller of a port to which the device 116 is coupled to by delay in assertion by the device 116 of control signals indicating insertion, as described in greater detail above. In some embodiments, during the duration of such delay, a root port 122 or switch 120 may be configured to simulate responses to operating system 106 bus scans to indicate to the operating system 106 that no device 116 is present, despite the presence of a device 116, as described above.

At step 206, management controller 112 may detect (e.g., via an out-of-band interface) the presence of device 116. At step 208, in response to detecting presence of device 116, management controller 112 may (e.g., via an out-of-band interface or via processor 103 with a PCIe VDM), perform platform-specific configuration of device 116 (e.g., change class code, unlock device 116, etc.). Steps 206 and 208 may occur before, after, or substantially contemporaneous with step 204.

At step 210, the hot-plug interrupt delay may end (e.g., via expiration of a period of time or in response to completion of the configuration of step 208), and operating system 106 may receive the hot-plug interrupt. In embodiments in which a root port 122 or switch 120 may be configured to simulate responses to operating system 106 bus scans to indicate to the operating system 106 that no device 116 is present during the delay, such root port 122 or switch 120 may cease such simulated responses upon expiration of the delay, thus allowing operating system 106 bus scans to discover the device 116 after the delay has expired.

At step 212, in response to the hot-plug interrupt, operating system 106 may begin controlling the device 116. After completion of step 212, method 200 may end.

Although FIG. 2 discloses a particular number of steps to be taken with respect to method 200, it may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
a processor; and
a port configured to couple a hot-pluggable device received in the information handling system to the processor, the port comprising a hot-plug controller configured to:
  detect insertion of the hot-pluggable device into the information handling system; and
  delay communication of a hot-plug interrupt to an operating system executing on the processor in response to the insertion of the hot-pluggable device in order to allow for platform-specific configuration of the hot-pluggable device, wherein the delaying includes simulating responses to bus scans to the operating system to indicate to the operating system that the hot-pluggable device is not present, despite the presence of the hot-pluggable device.

2. The information handling system of claim 1, wherein the port comprises a root port integral to the processor.

3. The information handling system of claim 1, wherein the port comprises a downstream port of a switch communicatively interfaced between the processor and the hot-pluggable device.

4. The information handling system of claim 1, wherein the platform-specific configuration of the hot-pluggable device comprises at least one of changing a class code of a controller associated with the hot-pluggable device and applying a digital key for unlocking the device.

5. The information handling system of claim 1, wherein delaying communication of the hot-plug interrupt comprises delaying communication of the hot-plug interrupt for a fixed period of time.

6. The information handling system of claim 1, wherein simulating responses to the bus scans includes responding to a Configuration Read with an Unsupported Request message.

7. The information handling system of claim 1, wherein delaying communication of the hot-plug interrupt comprises ceasing of delaying communication of the hot-plug interrupt in response to completion of the platform-specific configuration.

8. A method comprising:
detecting insertion of a hot-pluggable device into an information handling system comprising a processor and a port configured to couple the hot-pluggable device to the processor; and
delaying communication of a hot-plug interrupt to an operating system executing on the processor in response to the insertion of the hot-pluggable device in order to allow for platform-specific configuration of the hot-pluggable device, wherein the delaying includes simulating responses to bus scans to the operating system to indicate to the operating system that the hot-pluggable device is not present, despite the presence of the hot-pluggable device.

9. The method of claim 8, wherein the port comprises a root port integral to the processor.

10. The method of claim 8, wherein the port comprises a downstream port of a switch communicatively interfaced between the processor and the hot-pluggable device.

11. The method of claim 8, wherein the platform-specific configuration of the hot-pluggable device comprises at least one of changing a class code of a controller associated with the hot-pluggable device and applying a digital key for unlocking the device.

12. The method of claim 8, wherein delaying communication of the hot-plug interrupt comprises delaying communication of the hot-plug interrupt for a fixed period of time.

13. The method of claim 8, wherein simulating responses to the bus scans includes responding to a Configuration Read with an Unsupported Request message.

14. The method of claim 8, wherein delaying communication of the hot-plug interrupt comprises ceasing of delaying communication of the hot-plug interrupt in response to completion of the platform-specific configuration.

15. The method of claim 8, wherein delaying communication of the hot-plug interrupt to the operating system is performed by the port.

16. The method of claim 8, wherein delaying communication of the hot-plug interrupt to the operating system is performed by the hot-pluggable device.

17. The method of claim 16, wherein delaying communication of the hot-plug interrupt to the operating system comprises, by the hot-pluggable device, delaying assertion of one or more signals indicating insertion of the hot-pluggable device.

18. A hot-pluggable device comprising circuitry configured to, in response to insertion of the hot-pluggable device into an information handling system, delay communication of a hot-plug interrupt to an operating system executing on the information handling system in response to the insertion of the hot-pluggable device in order to allow for platform-specific configuration of the hot-pluggable device, wherein the delaying includes simulating responses to bus scans to the operating system to indicate to the operating system that the hot-pluggable device is not present, despite the presence of the hot-pluggable device.

19. The hot-pluggable device of claim 18, wherein the platform-specific configuration of the hot-pluggable device comprises at least one of changing a class code of a controller associated with the hot-pluggable device and applying a digital key for unlocking the device.

20. The hot-pluggable device of claim 18, wherein delaying communication of the hot-plug interrupt comprises delaying communication of the hot-plug interrupt for a fixed period of time.

21. The hot-pluggable device of claim 18, wherein simulating responses to the bus scans includes responding to a Configuration Read with an Unsupported Request message.

22. The hot-pluggable device of claim 18, wherein delaying communication of the hot-plug interrupt comprises ceasing of delaying communication of the hot-plug interrupt in response to completion of the platform-specific configuration.

* * * * *